Figure 1:
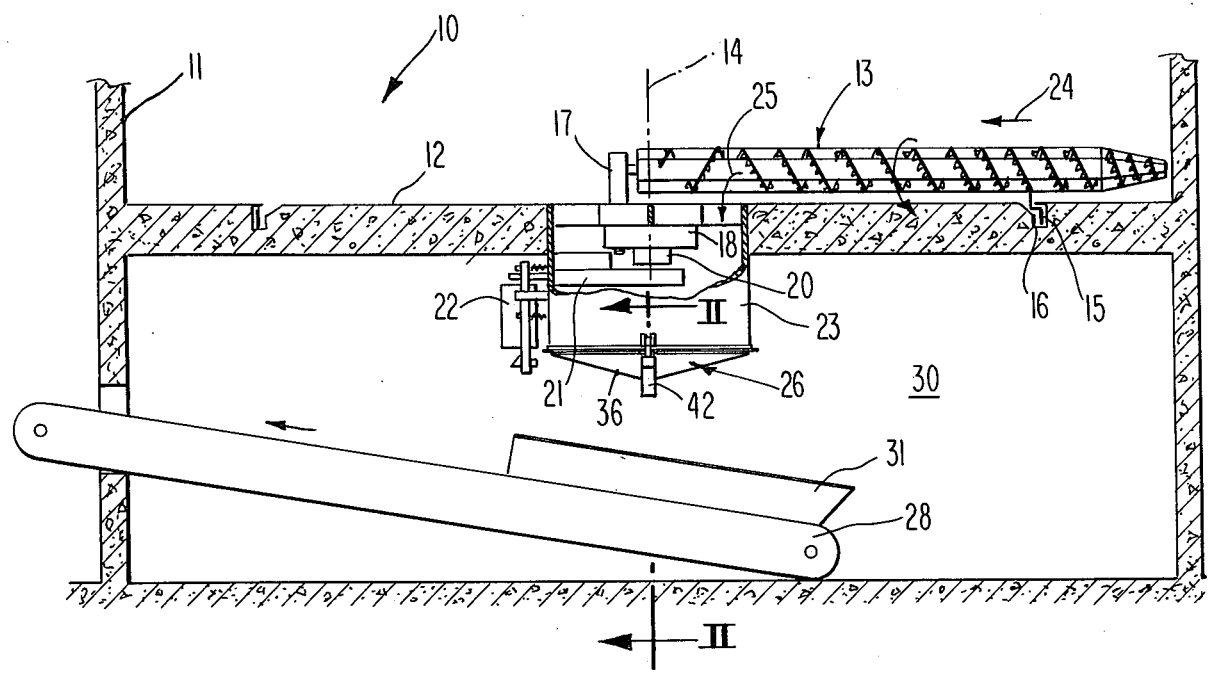

United States Patent [19]

Weaver

[11] 4,057,153

[45] Nov. 8, 1977

[54] SILO CENTER DISCHARGE MECHANISM

[76] Inventor: Richard L. Weaver, Rte. 4, Myerstown, Pa. 17067

[21] Appl. No.: 635,394

[22] Filed: Nov. 26, 1975

Related U.S. Application Data

[60] Continuation-in-part of Ser. No. 526,690, Nov. 25, 1974, Pat. No. 3,977,543, which is a division of Ser. No. 354,496, April 26, 1973, Pat. No. 3,874,524.

[51] Int. Cl.² .............................................. B65G 65/46
[52] U.S. Cl. ................................ 214/17 DA; 222/531
[58] Field of Search ....................... 214/17 D, 17 DA; 222/45, 556, 531, 532, 536, 537; 251/294; 105/283; 193/17, 21

[56] References Cited

U.S. PATENT DOCUMENTS

| 851,365 | 4/1907 | Moore | 251/294 X |
|---|---|---|---|
| 1,527,633 | 2/1925 | Debay | 193/21 X |
| 3,135,432 | 6/1964 | McKinney | 222/556 X |
| 3,678,902 | 7/1972 | Ruth | 222/556 |
| 3,817,407 | 6/1974 | Cantenot | 214/17 DA |
| 3,828,946 | 8/1974 | Lepley | 214/17 DA |

Primary Examiner—Robert G. Sheridan
Attorney, Agent, or Firm—Paul & Paul

[57] ABSTRACT

A center discharge mechanism is provided for a silo bottom unloader, wherein an auger sweeps across the floor of the silo while rotating, and conveys silage toward a generally central discharge opening, for conveyance of silage to a zone disposed beneath the silo floor at the center thereof. There is a sealed bottom discharge door for the chute at the center of the silo, which door is openable and which, when opened, has a flat surface such that, when it is opened and placed in a given position, it functions also as a deflector, for deflecting silage laterally of the geometric center of the silo, onto a conveyor mechanism or the like, for conveyance of silage outwardly of the zone beneath the center of the silo, for use.

10 Claims, 3 Drawing Figures

SILO CENTER DISCHARGE MECHANISM

CROSS-REFERENCE TO RELATED APPLICATIONS

This is a continuation-in-part of my co-pending U.S. application Ser. No. 526,690, filed Nov. 25, 1974, now U.S. Pat. No. 3,977,543, which itself was a division of U.S. application Ser. No. 354,496, filed Apr. 26, 1973, now U.S. Pat. No. 3,874,524, the latter disclosure of which is herein incorporated by reference.

BACKGROUND OF THE INVENTION

In another silo, that of my above-mentioned U.S. Pat. No. 3,874,524, it is known to utilize a central discharge for bottom unloading of a silo, wherein the silo is of the type that utilizes an auger that sweeps across the floor of the silo, while rotating, for conveying silage to a central discharge location. In that device, the passageway between the bottom central portion of the silo and a zone therebeneath has been openably sealed, to prevent access by vermin, or the like.

SUMMARY OF THE INVENTION

The present invention is directed toward providing an improvement on a sealed silo central discharge door, wherein the silage is conveyed by means of an auger toward a central discharge opening, but wherein the door also functions as a lateral deflector, for deflecting silage conveyed through the passageway into a conveyor or the like, for subsequent discharge of silage from a location beneath the passageway, to a location externally of the silo.

Accordingly, it is a primary object of this invention to provide a novel bottom sealing door for a silo central discharge.

It is another object of the present invention to provide a novel bottom closure door for a silo central discharge, wherein the closure door also functions as a lateral deflector.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

FIG. 1 is a fragmentary vertical sectional view, taken through a silo and central discharge in accordance with the present invention, wherein an auger is illustrated in elevation, as is a bottom conveyor.

Figure 2:
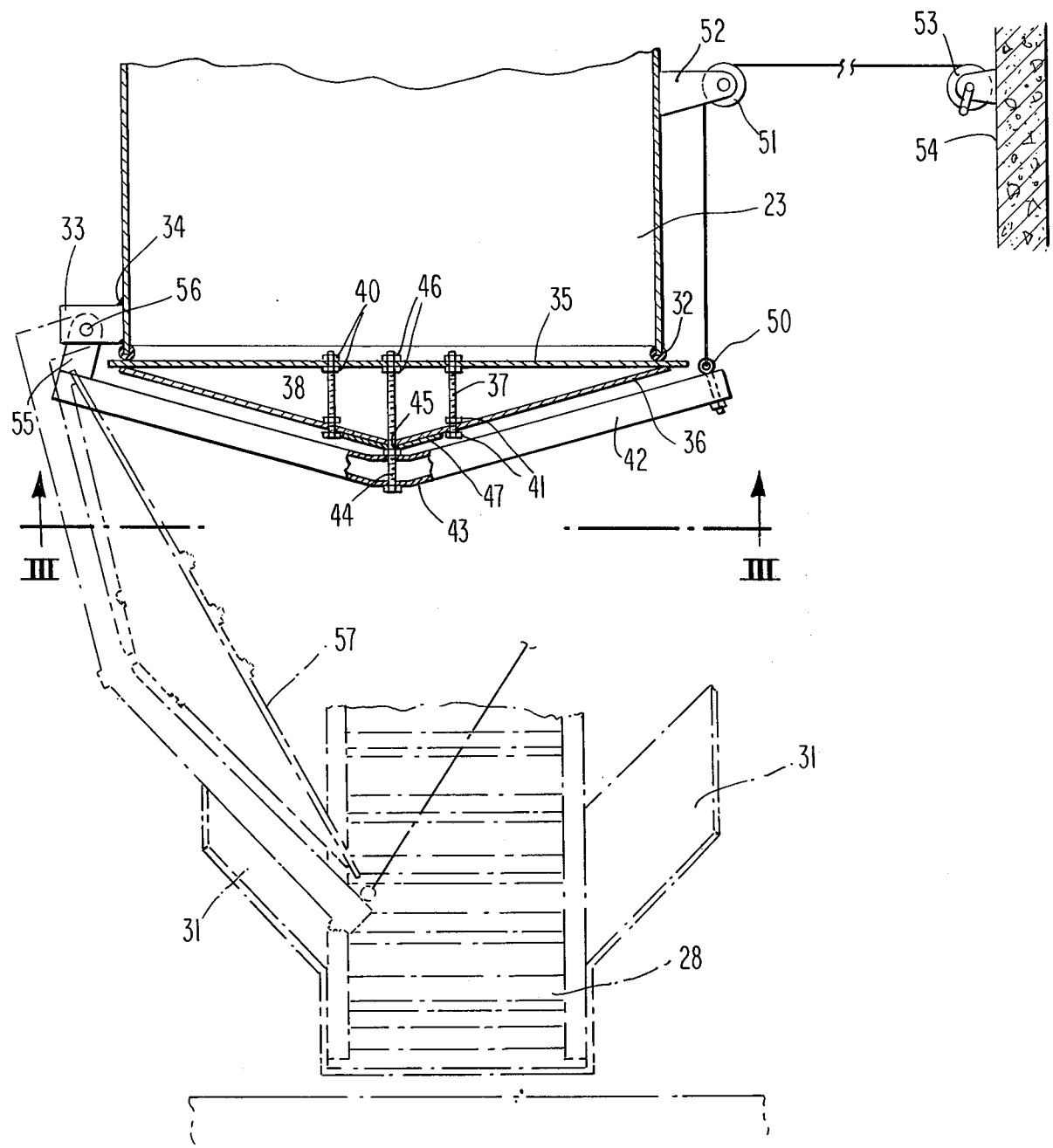

FIG. 2 is an enlarged fragmentary vertical sectional view, taken through the silo central discharge of the present invention, and with the conveyor disposed therebeneath being illustrated in phantom, with the silo bottom closure being illustrated in both full line and phantom positions corresponding respectively to closed and open positions of the silo passageway closure in accordance with the present invention.

Figure 3:
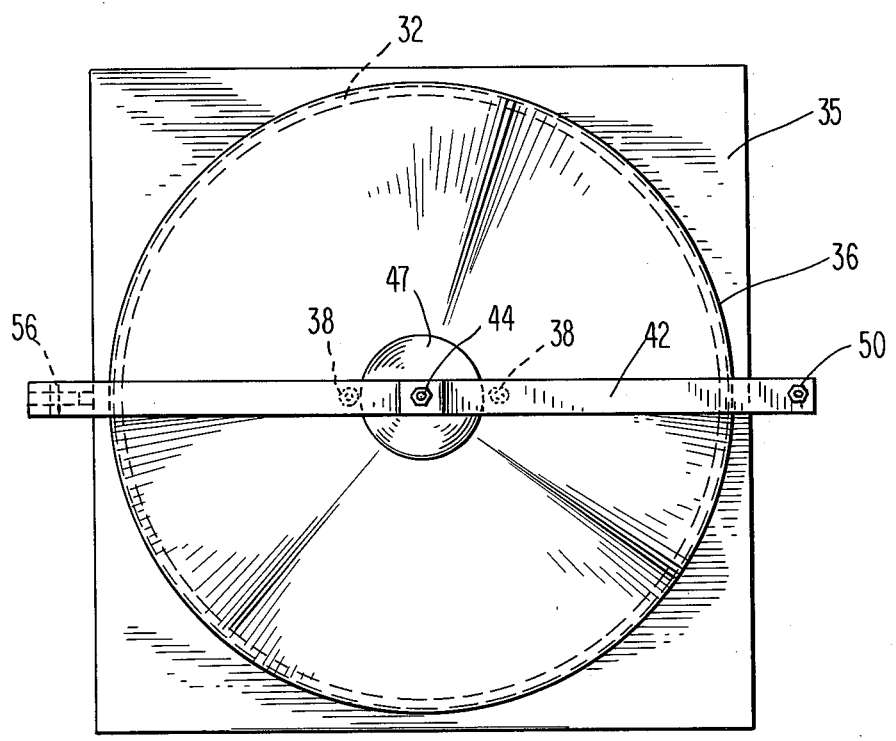

FIG. 3 is a bottom view of the closure mechanism for a silo bottom central discharge opening in accordance with the present invention.

DETAILED DESCRIPTIONS OF THE PREFERRED EMBODIMENTS

Referring now to the drawings in detail, reference is first made to FIG. 1, wherein a silo is generally designated by the numeral 10, as comprising a generally vertical cylindrical structure of poured concrete or like construction, comprising the silo walls 11, and with a silo floor 12 also being provided. A generally radially disposed auger 13 is provided, centrally mounted for rotation about its own axis, and for a traversing movement across the generally circular floor 12 of the silo about a silo central axis 14, such that the radial rightmost end of the auger 13 moves out of the direction of the paper of the illustration of FIG. 1.

Drive means (not shown) are provided for driving a band 15 located in a track 16 in the floor 12 of the silo, by hydraulic drive, for traversing or sweeping the silo across the floor 12.

Means are provided for providing rotation of the auger 13 about its own axis, comprising a suitable drive train 17, 18, 20, and with a belt drive 21 providing rotational power 22 through a speed reduction 20, from beneath the floor 12 of the silo, and from outside a generally cylindrical centrally located silage discharge chute or passageway 23. As the auger 13 rotates about its own axis and sweeps across the floor 12 of the silo, it delivers silage radially inwardly, in the direction of the arrow 24 illustrated in FIG. 1, to pass into the chute 23 as indicated by the arrow 25. The motor 22 may be an electric motor if desired.

The bottom closure is identified generally by the numeral 26, in FIG. 1. A sloped conveyor 28 is provided in a lower zone 30 beneath the silo, with the conveyor 28 having sidewalls 31 forming a type of hopper inlet, for delivery of silage from a location generally beneath the chute 23, to a location outside the silo 10.

With particular reference now to FIG. 2, it will be seen that the chute 23 is of right circular cylindrical construction, preferably sheetmetal or the like, and has a preferably rubber, or otherwise elastomeric sealing bead 32 on its lower edge, as illustrated.

A pivot mounting bracket 33 is provided, carried at the left-most end thereof and secured thereto by means of a weldment 34 or the like.

A pivotally operable sealing door 35 is provided, that may be of plastic, metal, or even of plywood of like construction, to be sufficiently rigid to effect the desired sealing against the bead 32, but to be sufficiently resiliently flexible that forces exerted thereon by outer edges of a conical support member 36 may bend the outer edges of the same where necessary in order to effect a tight sealing engagement against the bead 32.

The member 35 is generally of rectangular configuration as illustrated in FIG. 3, and is provided with a member 36 of generally circular configuration as viewed in FIG. 3, but which is of conical configuration in cross-section as viewed in FIG. 2. The conical member 36 is connected at its geometric center to the member 35 (also at its geometric center) by threaded fastener members 37 and 38, each with suitable nuts or the like 40 connecting them to the member 35 at the upper end, and with likewise suitable adjustable nuts or the like 41 at their lower ends, the adjustability at each end being desirable from the standpoint of regulating the tension or pressure that the outer peripheral edges of the conical member 36 will exert against the lower surface of the rectangular member 35, in its own sealed condition, for keeping the outer but upper surface portions of the member 35 generally coplanar.

A support frame or bar 42, of bent configuration as illustrated in FIG. 2, is provided, preferably being of rectangularly cross-sectional tubing. The member 42 is bent at its central portion 43, as indicated, and is provided with a threaded fastener member 44 connected thereto, and passing upwardly through an opening 45 in the conical member 36, to be connected at the approximate geometric center of the member 35 by suitable nut type fastener members 46. It will be noted that a conically configured additional support member 47, may, if desired, be provided at the conical center-most portion of the lower end of the member 36, as illustrated in FIG. 2, for additional support. It will be apparent, that the opening 45 is sufficiently large to allow the threaded member 44 to pass therethrough, without engagement therewith, in order that upwardly directed sealing forces may be applied to the geometric center of the planar closure member 35, for effecting its sealed engagement, tightly against the bead 32. In accomplishing the sealing, it will be apparent that the conical member 36 functions principally to keep the outer periphery of the flat member 35 coplanar, rather than for example, sinussoidal, or buckled, but that the sealing force will preferably be applied directly from the member 42 to the member 35, through the threaded member 44.

A closure cable 48 is connected to the right-most end of the member 42 by a toggle bolt 50, as illustrated in FIG. 2, with the cable 48 passing around a pulley 51 carried by a suitable mounting bracket 52 that in turn is carried by the outer end of the chute 23, with the cable 48 then passing to a pulley crank arrangement 53, adapted for manual operation, and carried by a wall 54 of the bottom zone 30 beneath the silo. It will be apparent, that in the alternative, the manual operating mechanism 53 may be accessible from outside the silo, as desired.

The frame 42 has a spacer portion 55, for spacing the pivot point 56 an amount to clear the left-most ends of the members 35 and 36, as viewed in FIG. 2. The members 55 and 42 are otherwise rigidly mounted together.

With reference to FIG. 2, it will be seen that, in the open position, the deflecting surface 57 of the member 35 is adapted to laterally deflect silage passing downwardly through the chute 23, directly onto the conveyor 28, as illustrated in FIG. 2, for ready delivery of the silage up the conveyor 28. The hopper wall portions 31 facilitate the prevention of spillage or loss of material upon entry onto the conveyor 28.

It will be apparent that the conveyor 28 may be located at locations other than precisely below the geometrical center of the chute 23, as desired, it being only necessary to adjust the amount that the closure 26 is opened, accordingly, in order that it may properly function as a deflector for deflecting material delivered through the chute 23 onto the conveyor 28. It will further be apparent that various modifications may be made in the details of construction, as well as in the use and operation of the device of the present invention, all within the spirit and scope of the invention as defined in the appended claims.

What is claimed is:

1. In a silo bottom unloader wherein a generally radially disposed auger is pivotally mounted inside the silo for sweeping across the bottom of the silo while rotating and delivering silage to a generally centrally located bottom discharge passageway for subsequent delivery of the silage to a conveyor mechanism that carries silage outwardly of the silo, the improvement comprising a bottom closure for the passageway, said closure comprising a pivotally openable door sealing means for sealing said door relative to the lower end of said passageway, said door having a generally flat surface in a closed generally horizontal sealing position of said door, said door having a support mechanism therebeneath pivotally disposed relative to the lower end of said passageway, said flat surface comprising a combination sealing surface and lateral deflection means for deflecting silage delivered through said passageway, laterally thereof, wherein said passageway comprises a generally circular lower end, wherein said upper surface of said door is mounted on and carried by said support mechanism, and including a generally conical member disposed beneath said horizontal surface member and by which said horizontal surface member is carried, and wherein said support mechanism comprises a frame member traversing said conical member therebeneath, including means generally rigidly connecting said horizontal surface member and said frame member 2. The closure of claim 1, including a combination raising and lowering mechanism connected to said support mechanism for remote raising and lowering thereof.

3. The closure of claim 2, wherein said raising and lowering mechanism comprises a cable operative device connected to said frame member 4. The closure of claim 5, including means for positioning the open setting of said surface member at a predetermined silage deflection position.

5. The closure of claim 1, wherein said horizontal surface member is in engaged but unconnected relation to the said conical member at the periphery thereof.

6. The closure of claim 5, wherein pivot connection means is provided at one side of said passageway, in connection with said support mechanism.

7. The closure of claim 6, wherein said horizontal surface member is generally rectangular, and wherein said sealing means is carried by said passageway.

8. The closure of claim 7, including in the combination a conveyor mechanism below said silo and having a position disposed below said passageway and unaligned centrally relative thereto for receiving silage laterally deflected from said passageway thereon.

9. The closure of claim 1, wherein said horizontal surface member is in connected relation through the conical member to the frame member only at the approximate geometric center of each of them.

10. The closure of claim 1 further comprising means for regulating the pressure said door exerts on said lower end of said passageway.

* * * * *